United States Patent
Onuma et al.

(10) Patent No.: US 11,965,799 B1
(45) Date of Patent: Apr. 23, 2024

(54) INTEGRATED-PHOTONIC ELECTROMAGNETIC SIGNAL DETECTOR

(71) Applicant: United States of America as represented by the Administrator of NASA, Washington, DC (US)

(72) Inventors: Eleanya Onuma, Springdale, MD (US); Manohar Deshpande, Odenton, MD (US); Mark Stephen, Catonsville, MD (US); Fabrizio Gambini, Santa Barbara, CA (US); Charles Turner, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 79 days.

(21) Appl. No.: 17/943,870

(22) Filed: Sep. 13, 2022

(51) Int. Cl.
*G01M 11/02* (2006.01)
*H01Q 9/04* (2006.01)

(52) U.S. Cl.
CPC ...... *G01M 11/0228* (2013.01); *H01Q 9/0407* (2013.01)

(58) Field of Classification Search
CPC .......................... G01M 11/0228; H01Q 9/0407
See application file for complete search history.

(56) References Cited

U.S. PATENT DOCUMENTS 6,093,246 A * 7/2000 Lin ...................... G02B 6/1221
117/92
11,209,473 B2 * 12/2021 Amarloo ................ H01Q 15/24

* cited by examiner

*Primary Examiner* — Seung C Sohn
(74) *Attorney, Agent, or Firm* — Christopher O. Edwards; Matthew F. Johnston; Trenton J. Roche

(57) ABSTRACT

An electromagnetic signal detector includes a photonic crystal substrate, an antenna disposed on the substrate and having an active feed region and a ground region spaced apart from one another by a gap, a photonic crystal disposed on the substrate at the gap, and an electro optic polymer disposed on the photonic crystal.

24 Claims, 4 Drawing Sheets

INTEGRATED-PHOTONIC ELECTROMAGNETIC SIGNAL DETECTOR

ORIGIN OF THE INVENTION

The invention described herein was made in part by an employee of the United States Government and may be manufactured and used by and for the Government of the United States for governmental purposes without the payment of any royalties thereon of therefor.

BACKGROUND OF THE INVENTION

1. Field of the Invention

This invention relates to electromagnetic signal detection. More specifically, the invention is an electromagnetic wave or signal detector having integrated photonics.

2. Description of the Related Art

Detection of electromagnetic waves or signals in the atmosphere or space is a critical part of communication and/or remote sensing. For example, radiometers operating in the micro and millimeter range of the electromagnetic spectrum are essential for profiling various atmospheric constituents of planetary bodies to include molecules and radicals of water, ozone, etc. While the advent of electronics-based broadband and multi-frequency radiometers have increased the profiling capability of radiometers, this advancement has also increased instrument "Size, Weight, Power, and Cost" or SWaP-C as it is known. The resulting conflict between performance and SWaP-C is particularly problematic when designing sensing systems for small-size applications such as small satellite platforms or small communications devices.

SUMMARY OF THE INVENTION

Accordingly, it is an object of the present invention to provide an electromagnetic wave or signal detector.

Another object of the present invention is to provide an electromagnetic wave or signal detector that can be adapted for use in communications systems or remote sensing systems.

Still another object of the present invention is to provide an electromagnetic wave or signal detector that can satisfy both performance and Swap-C constraints imposed by small operational platforms.

Other objects and advantages of the present invention will become more obvious hereinafter in the specification and drawings.

In accordance with the present invention, an electromagnetic signal detector includes a photonic crystal substrate and an antenna disposed on the substrate. The antenna includes an active feed region and a ground region spaced apart from one another by a gap. A two-dimensional photonic crystal is disposed on the substrate at the gap. An electro optic polymer is disposed on the photonic crystal.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

Figure 1:
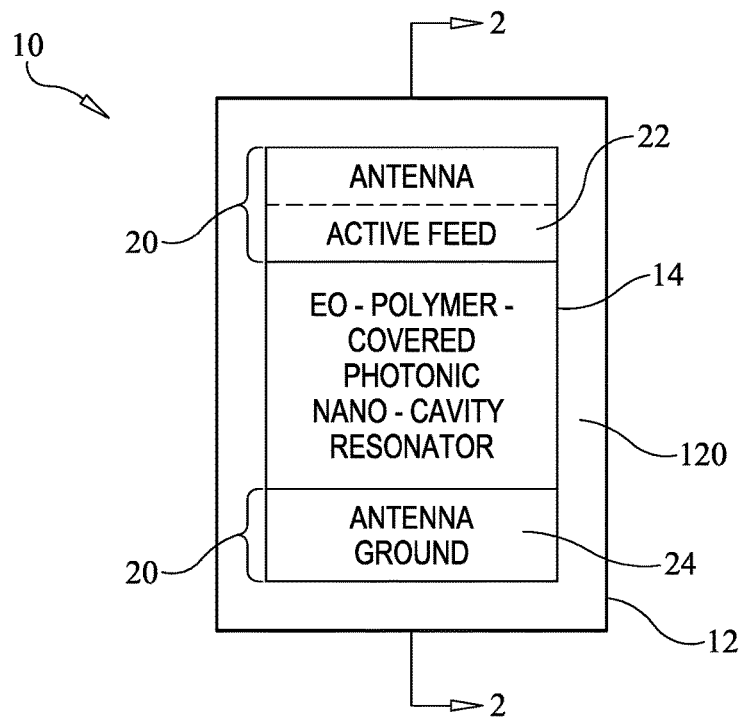
FIG. 1 is schematic view of an integrated-photonic electromagnetic signal detector in accordance with an embodiment of the present invention.
Figure 7:
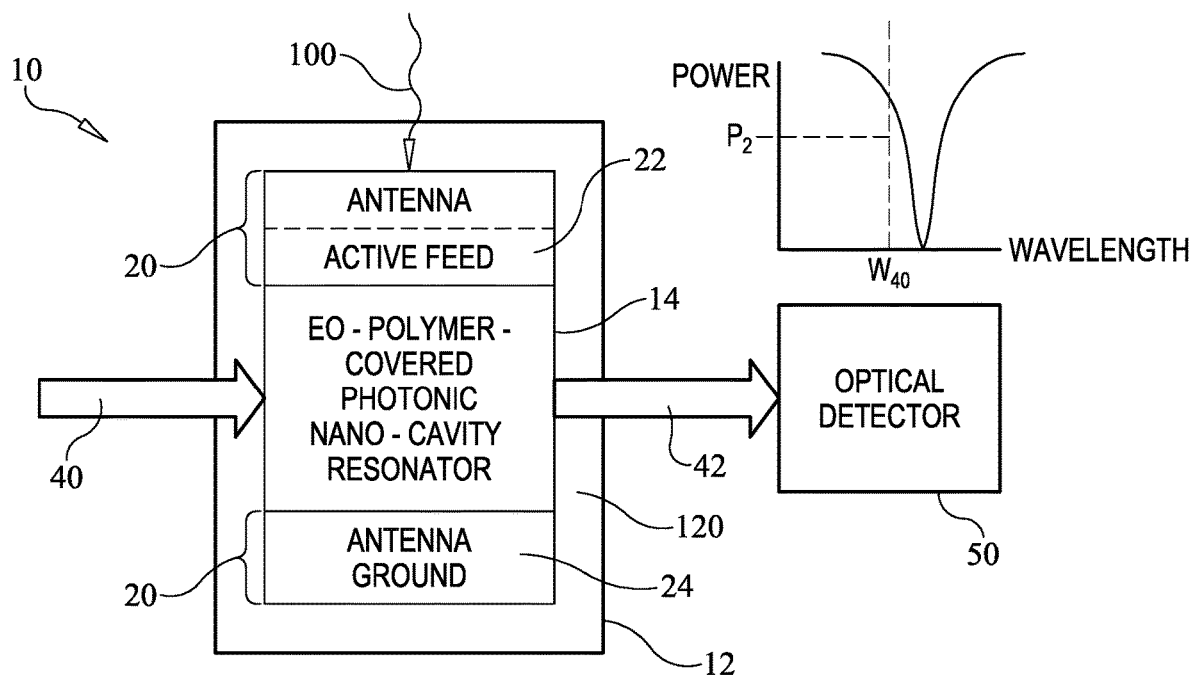
Figure 8:
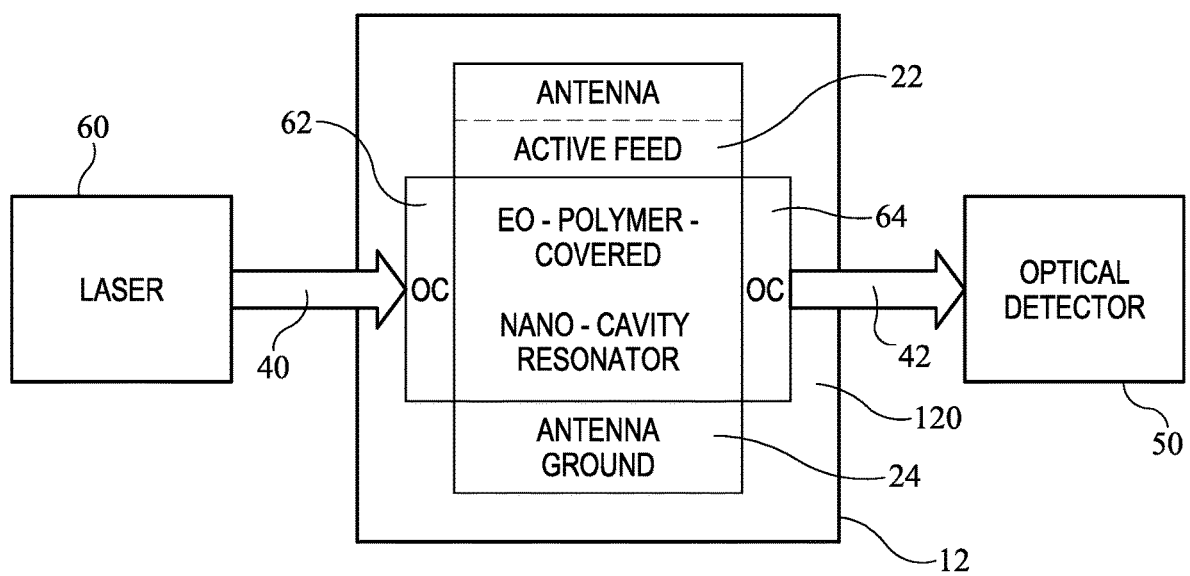

FIG. 7 is a schematic view of a second operational scenario of the detector illustrated in FIG. 1 in which an input optical signal is applied thereto to generate an output optical signal when an electromagnetic signal is present; and FIG. 8 is a schematic view of an integrated-photonic electromagnetic signal detector that includes a laser and optical detector in accordance with an embodiment of the present invention.

DESCRIPTION OF THE PREFERRED EMBODIMENT(S)

Figure 2:
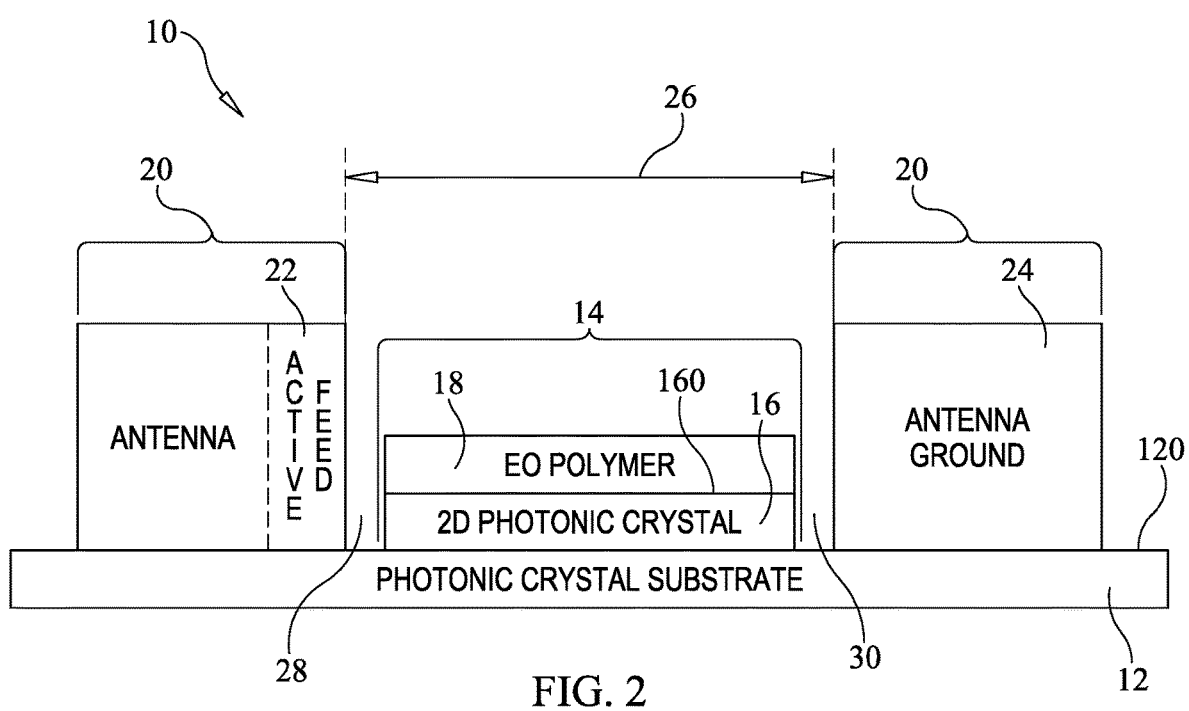
FIG. 2 is a schematic cross-sectional view of the integrated-photonic electromagnetic signal detector taken along line 2-2 in FIG. 1.

Referring now to the drawings, simultaneous reference will be made to FIGS. 1 and 2 where an integrated-photonic electromagnetic signal detector is illustrated and is referenced generally by numeral 10. Detector 10 can be adapted for use in a variety of instruments to include remote sensing instruments (e.g., radiometers, spectrometers, etc.), transceivers used in communications networks (e.g., fifth generation or "5G" mobile communications systems), and other electromagnetic signal detection applications. Accordingly, it is to be understood that the essential and novel features of detector 10 can be implemented and utilized in a variety of ways without departing from the scope of the present invention.

In general, detector 10 is a small-scale or chip-size device that can be fabricated using well-known electronic chip-fabrication techniques, the choice of which is not a limitation of the present invention. Detector 10 includes a photonic crystal substrate 12 that is of the type typically used in the fabrication of two-dimensional photonic crystals. As is known in the art, photonic crystals can be constructed from macroporous silicon (i.e., a slab or wafer of silicon having an array of air pores therein) disposed on a silicon-on-insulator substrate. Accordingly, in some embodiments of the present invention, substrate 12 is a silicon-on-insulator wafer having a planar surface 120. It is to be understood that substrate 12 can be other photonic crystal substrate materials (e.g., a III-V material platform) without departing from the scope of the present invention.

Disposed on surface 120 of substrate 12 is an electro optic ("EO")-polymer-covered photonic nano-cavity resonator 14

(hereinafter simply referred to as "resonator 14"). Resonator 14 includes a two-dimensional ("2D") photonic crystal 16 disposed on substrate 12 and an EO polymer 18 disposed on and covering a top surface 160 of photonic crystal 16.

Photonic crystal 16 is a slab or wafer of silicon having a pattern of pores (not shown in FIGS. 1 and 2) configured in a 2D array at top surface 160 that defines the optical transmission properties of photonic crystal 16. As is known in the art, the configuration of photonic crystal 16 to include its 2D pore pattern can define a waveguide governing the crystal's optical transmission properties. See, for example, T. Baba, "Slowlight in photonic crystals," Nature Photon., pp. 465-473, 2008. Briefly, a 2D arrangement of pores in photonic crystal 16 is used to create what are known as "line defects" that act as an optical waveguide. For example, a line defect can be created by changing the pore radius for a whole line of pores disposed along a direction of light propagation through photonic crystal 16. Another way to create line defects is to eliminate pores from a periodic array thereof. The line defects are frequently positioned in the band gap of the photonic crystal. The mechanism used to create a line defect(s) in photonic crystal 16 and the type/specifications of a waveguide resulting from the line defect(s) are not limitations of the present invention.

Top surface 160 of photonic crystal 16 is covered with an EO polymer 18. A variety of EO polymers are known in the art and/or can be engineered to desired specifications for a particular application. In general, EO polymer 18 has a known index of refraction that impacts the wavelength of an optical wave/signal passing there through in a known or predictable way. The covering of photonic crystal 16 with EO polymer 18 can be achieved in a variety of ways (e.g., spin coating) without departing from the scope of the present invention.

Figure 3:
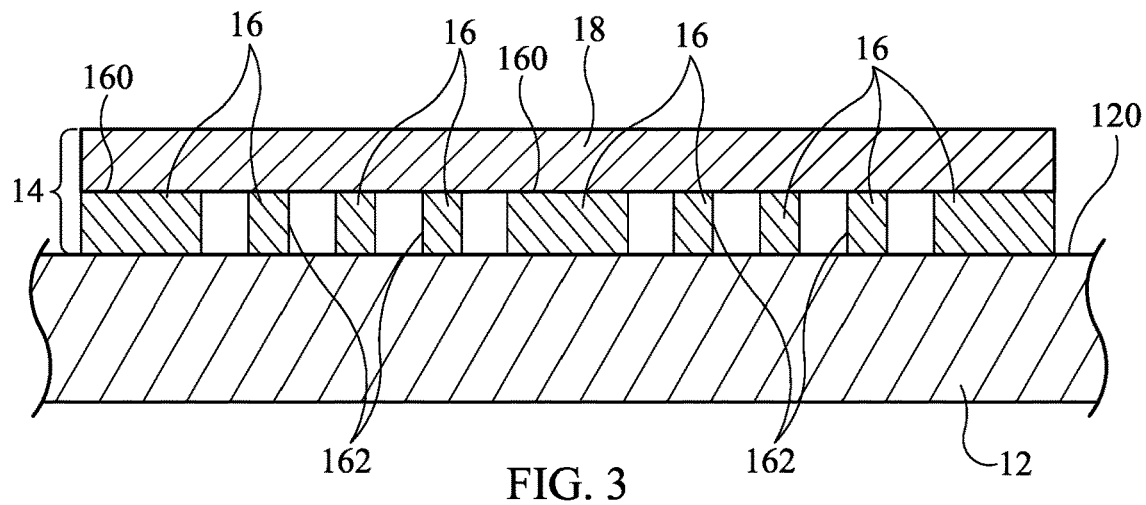
FIG. 3 is an isolated cross-sectional view of an electro optic ("EO") polymer-covered photonic nano-cavity resonator in accordance with an embodiment of the present invention.
Figure 4:
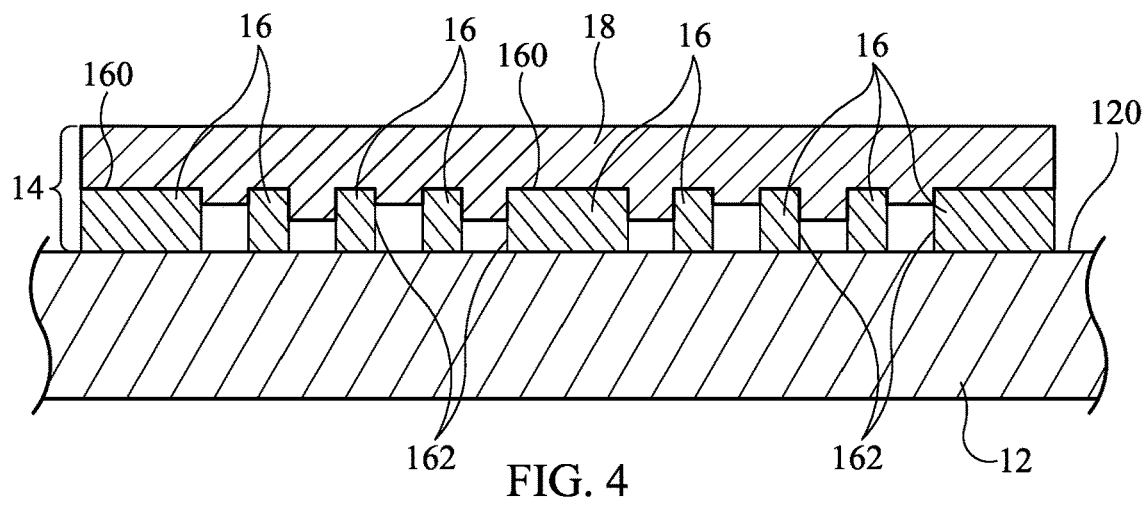
FIG. 4 is an isolated cross-sectional view of an electro optic ("EO") polymer-covered photonic nano-cavity resonator in accordance with another embodiment of the present invention.
Figure 5:
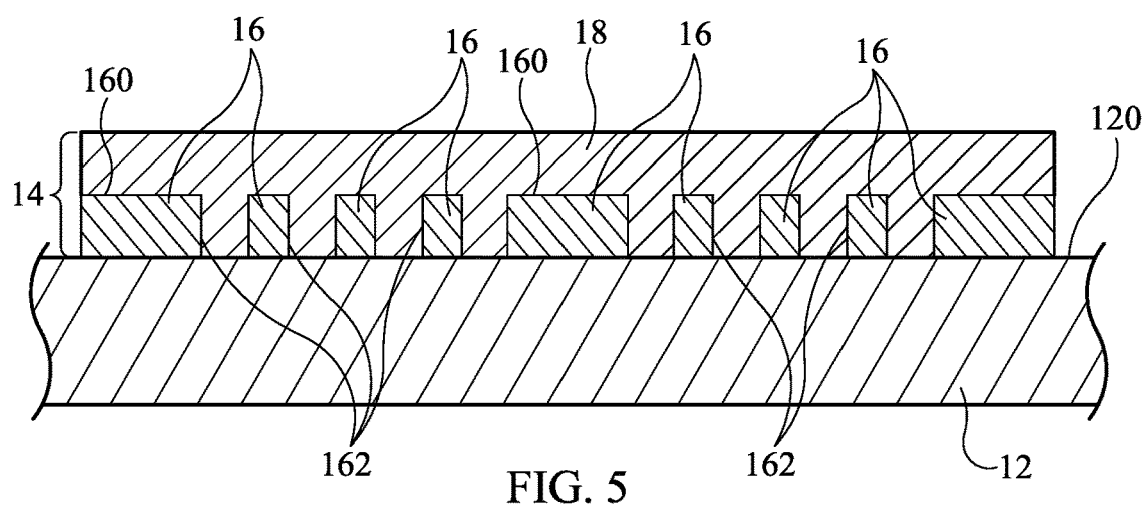
FIG. 5 is an isolated cross-sectional view of an electro optic ("EO") polymer-covered photonic nano-cavity resonator in accordance with still another embodiment of the present invention.

The covering of photonic crystal 16 with EO polymer 18 can be done in a way that does not fill, partially fills, or fully fills the pores 162 in photonic crystal 16 as illustrated in the isolated cross-sections shown in FIGS. 3-5. In FIG. 3, EO polymer 18 is disposed just on top surface 160 of photonic crystal 16 such that none of EO polymer 18 is deposited in any of pores 162. FIG. 4 illustrates an embodiment where top surface 160 is covered by EO polymer 18 and pores 162 are partially filled with EO polymer 18. The amount of partial filling of pores 162 can be the same or different (as shown) without departing from the scope of the present invention. In FIG. 5, EO polymer 18 covers top surface 160 and fully fills all pores 162.

Referring again to FIGS. 1 and 2, detector 10 includes an antenna 20 disposed/fabricated on surface 120 of substrate 12. Antenna 20 includes an active feed region 22 and a ground 24 separated from one another on substrate 12 by a gap referenced by two-headed arrow 26. For small-form, high-frequency detectors operating in the millimeter and micrometer wavelengths, antenna 20 can be a microstrip antenna. The particular shape, material, operational frequency, etc., of antenna 20 can be adapted for a particular application as known in the art without departing from the scope of the present invention. In the illustrated embodiment, small gaps 28 and 30 are defined between resonator 14 and active feed region 22 and ground 24, respectively. However, it is to be understood that one or both of gaps 28 and 30 may not be required for all embodiments of the present invention.

The above-described resonator 14 provides low-voltage, broadband modulation of an optical signal coupled thereto. The optical signal's propagation through resonator 14 is dictated by the resonator's waveguide properties in accordance with its 2D nano-cavity (i.e., pore) pattern and EO polymer covering.

Figure 6:
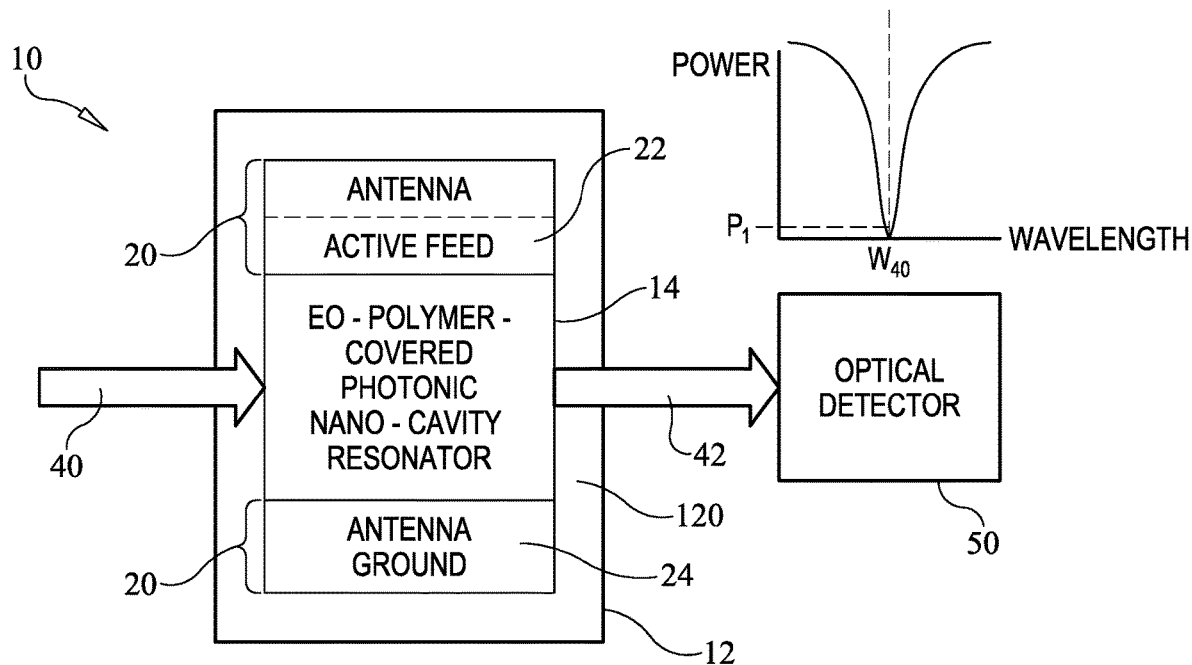
FIG. 6 is a schematic view of a first operational scenario of the detector illustrated in FIG. 1 in which an input optical signal is applied thereto to generate an output optical signal when no electromagnetic signal is present.

Referring additionally now to FIGS. 6 and 7, two operational scenarios for detector 10 are illustrated. In each case, an input optical signal provided to resonator 14 is referenced by an arrow 40. Input optical signal 40 propagates through resonator 14 in accordance with its optical properties (e.g., waveguide properties of photonic crystal 16, index of refraction of EO polymer 18, etc.). As a result of such propagation, an output optical signal 42 is emitted from resonator 14 and provided to an optical detector 50. The output power spectrum of resonator 14 presents as a notch spectrum as a function of wavelength "w" where the wavelength of input optical signal 40 is $W_{40}$. When antenna 20 is not receiving an electromagnetic wave or signal (for which it is tuned) as is the case in FIG. 6, the power spectrum notch occurs at wavelength $W_{40}$ such that a first power $P_1$ at wavelength $W_{40}$ is measured by detector 50. However, when antenna 20 is in receipt of an electromagnetic wave or signal 100 (for which it tuned) as is the case in FIG. 7, the RF electric field associated with electromagnetic signal 100 changes the refractive index of EO polymer 18 of resonator 14. The change in refractive index causes a corresponding change in the resonant frequency/wavelength of resonator 14 to thereby shift the power spectrum and its notch detected by optical detector 50. As a result, the power measured by optical detector 50 at wavelength $W_{40}$ increases to a power $P_2$ thereby providing an indication that electromagnetic signal 100 is present. By fixing the wavelength $W_{40}$ of input optical signal 40 and measuring power (at detector 50) at the same wavelength, the power $P_2$ is indicative of and can be calibrated to reflect the amplitude of electromagnetic signal 100.

As mentioned above, the integrated-photonic electromagnetic signal detector of the present invention can be realized in a variety of ways without departing from the scope of the present invention. For example, in some embodiments, the input optical signal is a laser beam. A laser device generating the laser beam can be an external device whose laser beam is coupled to the above-described resonator 14 by means of an optical coupler (e.g., grating coupler, edge coupler, etc.) as would be understood in the art. In some embodiments of the present invention, input optical signal 40 could be generated by an on-chip laser and associated optics. By way of a non-limiting exemplary embodiment, FIG. 8 depicts an external laser 60 generating input optical signal 40 that is coupled to one side of resonator 14 by means of an input optical coupler ("OC") 62 on substrate 12. An output optical coupler ("OC") 64 positioned at the opposite side of resonator 14 and on substrate 12 couples output optical signal 42 to optical detector 50.

The advantages of the present invention are numerous. The integrated-photonic electromagnetic signal detector is a small and flexible architecture that will achieve significant improvements in SWaP-C for a variety of applications covering a wide range of frequencies of operation. The detector of the present invention can be incorporated into a variety of scientific research systems to include remote sensing instruments, electromagnetic field sensors, and chip-scale spectrometers. The detector is also readily adapted for use in low-power transceivers required in many communications networks.

Although the invention has been described relative to specific embodiments thereof, there are numerous variations and modifications that will be readily apparent to those skilled in the art in light of the above teachings. It is

What is claimed as new and desired to be secured by Letters Patent of the United States is:

1. An electromagnetic signal detector, comprising:
   a photonic crystal substrate;
   an antenna disposed on said substrate, said antenna including an active feed region and a ground region spaced apart from one another by a gap;
   a two-dimensional photonic crystal disposed on said substrate at said gap; and
   an electro optic polymer disposed on said photonic crystal.

2. An electromagnetic signal detector as in claim 1, wherein said photonic crystal includes a pattern of pores, and wherein said electro optic polymer is at least partially filling at least a portion of said pores.

3. An electromagnetic signal detector as in claim 1, wherein said photonic crystal includes a pattern of pores, and wherein said electro optic polymer partially fills said pores.

4. An electromagnetic signal detector as in claim 1, wherein said photonic crystal includes a pattern of pores, and wherein said electro optic polymer fills said pores.

5. An electromagnetic signal detector as in claim 1, wherein said electro optic polymer has an index of refraction that changes when said antenna is adapted to receive an electromagnetic signal.

6. An electromagnetic signal detector as in claim 1, further comprising:
   an optical signal generator for transmitting an optical signal at a selected wavelength through said photonic crystal with said electro optic polymer disposed thereon to generate an optical output signal; and
   an optical detector for measuring power of said optical output signal at said selected wavelength.

7. An electromagnetic signal detector as in claim 1, wherein said photonic crystal with said electro optic polymer disposed thereon is adapted to have an optical signal at a selected wavelength transmitted there through to generate an optical output signal, said electromagnetic signal detector further comprising an optical detector for measuring power of said optical output signal at said selected wavelength.

8. An electromagnetic signal detector as in claim 1, wherein said antenna comprises a microstrip antenna.

9. An electromagnetic signal detector as in claim 1, wherein said substrate comprises a silicon-on-insulator wafer.

10. An electromagnetic signal detector, comprising:
    a photonic crystal substrate;
    a microstrip antenna affixed to said substrate, said microstrip antenna including an active feed region and a ground region spaced apart from one another by a gap;
    a two-dimensional photonic crystal disposed on said substrate at said gap, said photonic crystal having a pattern of pores therein; and
    an electro optic polymer disposed on said photonic crystal and at least partially filling at least a portion of said pores.

11. An electromagnetic signal detector as in claim 10, wherein said electro optic polymer has an index of refraction that changes when said microstrip antenna is adapted to receive an electromagnetic signal.

12. An electromagnetic signal detector as in claim 10, further comprising:
    an optical signal generator for transmitting an optical signal at a selected wavelength through said photonic crystal with said electro optic polymer disposed thereon to generate an optical output signal; and
    an optical detector for measuring power of said optical output signal at said selected wavelength.

13. An electromagnetic signal detector as in claim 10, wherein said photonic crystal with said electro optic polymer disposed thereon is adapted to have an optical signal at a selected wavelength transmitted there through to generate an optical output signal, said electromagnetic signal detector further comprising an optical detector for measuring power of said optical output signal at said selected wavelength.

14. An electromagnetic signal detector as in claim 10, wherein said substrate comprises a silicon-on-insulator wafer.

15. A method of detecting an electromagnetic signal, comprising the steps of:
    disposing an antenna on a photonic crystal substrate, wherein said antenna includes an active feed region and a ground region spaced apart from one another by a gap;
    disposing a two-dimensional photonic crystal on said substrate at said gap;
    covering said photonic crystal with an electro optic polymer;
    transmitting an optical signal at a selected wavelength through said photonic crystal covered with said electro optic polymer to generate an optical output signal; and
    measuring power of said optical output signal at said selected wavelength, wherein said power is indicative of amplitude of an electromagnetic signal received by said antenna.

16. A method according to claim 15, wherein said photonic crystal includes a pattern of pores, and wherein said step of covering includes the step of at least partially filling at least a portion of said pores.

17. A method according to claim 15, wherein said photonic crystal includes a pattern of pores, and wherein said step of covering includes the step of partially filling said pores.

18. A method according to claim 15, wherein said photonic crystal includes a pattern of pores, and wherein said step of covering includes the step of filling said pores.

19. A method according to claim 15, wherein said antenna comprises a microstrip antenna.

20. A method according to claim 15, wherein said substrate comprises a silicon-on-insulator wafer.

21. A method of detecting an electromagnetic signal, comprising the steps of:
    providing an antenna on a photonic crystal substrate, wherein said antenna includes an active feed region and a ground region spaced apart from one another by a gap;
    providing a two-dimensional photonic crystal covered with an electro optic polymer on said substrate at said gap;
    transmitting an optical signal at a selected wavelength through said photonic crystal covered with said electro optic polymer to generate an optical output signal; and
    measuring power of said optical output signal at said selected wavelength, wherein said power is indicative of amplitude of an electromagnetic signal received by said antenna.

22. A method according to claim 21, wherein said photonic crystal includes a pattern of pores, and wherein said electro optic polymer at least partially fills at least a portion of said pores.

23. A method according to claim 21, wherein said antenna comprises a microstrip antenna.

24. A method according to claim 21, wherein said substrate comprises a silicon-on-insulator wafer.

* * * * *